(12) United States Patent
Vigild et al.

(10) Patent No.: US 9,051,892 B2
(45) Date of Patent: Jun. 9, 2015

(54) METHOD FOR DETERMINING THE OXYGEN CONCENTRATION $O_2$ IN A GAS FLOW

(75) Inventors: Christian Winge Vigild, Aldenhoven (DE); Daniel Roettger, Eynatten (BE); Andreas Kuske, Geulle (NL)

(73) Assignee: Ford Global Technologies, LLC, Dearborn, MI (US)

( * ) Notice: Subject to any disclaimer, the term of this patent is extended or adjusted under 35 U.S.C. 154(b) by 589 days.

(21) Appl. No.: 13/354,942

(22) Filed: Jan. 20, 2012

(65) Prior Publication Data

US 2012/0186564 A1 Jul. 26, 2012

(30) Foreign Application Priority Data

Jan. 25, 2011 (DE) .......................... 10 2011 003 095

(51) Int. Cl.
| | |
|---|---|
| *F02D 41/14* | (2006.01) |
| *F02D 23/00* | (2006.01) |
| *F02D 41/24* | (2006.01) |

(52) U.S. Cl.
CPC ............ *F02D 41/1456* (2013.01); *F02D 23/00* (2013.01); *F02D 41/1448* (2013.01); *F02D 41/2474* (2013.01)

(58) Field of Classification Search
CPC ....... F02D 23/00; F02D 23/005; F02D 23/02; F02D 41/1448; F02D 41/1456; F02D 41/2474
USPC ............. 123/559.1–559.2, 661; 701/102, 112
See application file for complete search history.

(56) References Cited

U.S. PATENT DOCUMENTS 4,484,444 A * 11/1984 Bidwell .......................... 60/599
4,798,049 A   1/1989 Mayer
(Continued)

FOREIGN PATENT DOCUMENTS

| CN | 101289966 A | 10/2008 |
|---|---|---|
| CN | 101418744 A | 4/2009 |

(Continued)

OTHER PUBLICATIONS

Partial Translation of Office Action of Chinese Application No. 2012100202165, Issued Mar. 9, 2015, State Intellectual Property Office of PRC, 10 pages.

*Primary Examiner* — Thomas P Noland
(74) *Attorney, Agent, or Firm* — Julia Voutyras; Alleman Hall McCoy Russell & Tuttle LLP

(57) ABSTRACT

Embodiments for determining oxygen concentration using an oxygen sensor are provided. In one example, a method for determining oxygen concentration $O_2$ in a gas flow of an internal combustion engine which is equipped with an engine controller and an oxygen sensor comprises determining the oxygen concentration $O_{2,sens}$ of the gas flow in a ceramic measurement cell of the sensor by current $I_{Sens}$ which is detected by measurement and which flows when a constant voltage $U_{Sens}$ is applied and maintained, and correcting the oxygen concentration based on a pressure $p_{Sens}$ at the measurement cell. In this way, the measured oxygen concentration may be corrected based on the pressure of the air at the sensor.

5 Claims, 4 Drawing Sheets

(56) References Cited

U.S. PATENT DOCUMENTS

| | | | |
|---|---|---|---|
| 6,820,603 B2 * | 11/2004 | Yasui et al. | 123/672 |
| 7,606,654 B2 * | 10/2009 | Kawase et al. | 41/14 |
| 7,610,753 B2 * | 11/2009 | Kitahara | 60/295 |
| 7,739,026 B2 * | 6/2010 | Kuzuyama et al. | F02D 23/005 |
| 8,783,029 B2 * | 7/2014 | Vigild et al. | F02D 23/00 |
| 8,820,297 B2 * | 9/2014 | Iwatani | F02D 41/14 |
| 8,904,787 B2 * | 12/2014 | Styles et al. | 60/605.2 |
| 2004/0154590 A1 * | 8/2004 | Yasui et al. | |
| 2009/0277434 A1 * | 11/2009 | Surnilla | 123/65 R |
| 2011/0011153 A1 * | 1/2011 | Umehara | 73/23.31 |
| 2011/0214422 A1 * | 9/2011 | VanDyne et al. | 60/607 |
| 2012/0290190 A1 * | 11/2012 | Kim et al. | 701/102 |
| 2014/0123966 A1 * | 5/2014 | Ide et al. | F02D 23/00 |
| 2014/0360477 A1 * | 12/2014 | Doering et al. | F02D 41/14 |

FOREIGN PATENT DOCUMENTS

| | | | | |
|---|---|---|---|---|
| DE | 3546409 A1 | | 7/1987 | |
| EP | 334206 A2 | * | 9/1989 | F02B 37/00 |
| EP | 992663 A2 | * | 4/2000 | F02D 21/08 |
| EP | 1571321 A2 | * | 9/2005 | F02D 23/00 |
| EP | 1571322 A2 | * | 9/2005 | F02D 43/00 |
| EP | 2053224 A2 | * | 4/2009 | F02D 41/14 |
| JP | 2003286906 A | * | 10/2003 | F02M 25/07 |
| JP | 2009036038 A | | 2/2009 | |
| WO | WO 2007110774 A2 | * | 10/2007 | F02D 41/04 |

* cited by examiner

METHOD FOR DETERMINING THE OXYGEN CONCENTRATION $O_2$ IN A GAS FLOW

RELATED APPLICATIONS

The present application claims priority to German Patent Application No. 102011003095.6, filed on Jan. 25, 2011, the entire contents of which are hereby incorporated by reference for all purposes.

FIELD

The disclosure relates to a method for determining the oxygen concentration $O_2$ in a gas flow of an internal combustion engine which is equipped with an engine controller and an oxygen sensor.

BACKGROUND AND SUMMARY

Internal combustion engines are generally equipped with at least one oxygen sensor which may be arranged at the inlet side in the intake system and/or at the outlet side in the exhaust-gas discharge system. The knowledge of the oxygen concentration $O_2$ serves different purposes within the context of the control of internal combustion engines.

A sensor arranged in the intake system of the internal combustion engine may for example be used to control or regulate an exhaust-gas recirculation system, that is to say to adjust the recirculation rate.

Exhaust-gas recirculation (EGR), that is to say the recirculation of combustion gases from the outlet side to the inlet side of the internal combustion engine, is used in particular to reduce nitrogen oxide emissions. With increasing recirculation rate, the nitrogen oxide emissions can be considerably reduced.

Here, the exhaust-gas recirculation rate $x_{EGR}$ is determined as $x_{EGR} = m_{EGR} (m_{EGR} + m_{fresh\ air})$, where $m_{EGR}$ denotes the mass of recirculated exhaust gas and $m_{fresh\ air}$ denotes the supplied fresh air. To obtain a considerable reduction in nitrogen oxide emissions, high exhaust-gas recirculation rates $x_{EGR}$ are required which may be of the order of magnitude of up to 70%.

In order for the sensor to be impinged on by charge air, which may contain recirculated exhaust gas in addition to the fresh air, and not exclusively by fresh air, the sensor may be arranged downstream of the opening of the recirculation line of the EGR into the intake line.

The sensor detects the oxygen concentration $O_2$ in the charge-air flow, which concentration can be taken into consideration in an equation for determining the proportion $F_{intake}$ of the charge air fraction resulting from the combustion, and/or for determining the recirculation rate $x_{EGR}$. Using the sensor, it is therefore possible for the recirculation rate $x_{EGR}$ of the EGR to be adjusted, that is to say for a shut-off element, which is preferably arranged in the recirculation line and which serves as an EGR valve for adjusting the recirculation rate, to be actuated.

Under certain assumptions, it is possible in this way to realize closed-loop control of the EGR, for example if only a single exhaust-gas recirculation line is provided. Furthermore, the oxygen concentration $O_2$ detected by means of a sensor or the proportion $F_{intake}$ may be used to determine the nitrogen oxide concentration $C_{NOx,exhaust}$ in the exhaust gas, that is to say the untreated emissions of nitrogen oxides $NO_x$. Here, it is possible to dispense with an expensive $NO_x$ sensor, which is arranged in the exhaust-gas discharge system, for determining the nitrogen oxide concentration $C_{CNx,exhaust}$, exhaust in the exhaust gas and/or for regulating the EGR valve, that is to say for regulating the exhaust-gas quantity recirculated.

In the case of an internal combustion engine which is supercharged by an exhaust-gas turbocharger and which is equipped with a low-pressure EGR arrangement in which a recirculation line branches off from the exhaust line downstream of the turbine and opens into the intake line upstream of the compressor, the oxygen sensor is preferably arranged downstream of the compressor and upstream of a charge-air cooler which may be provided.

On the one hand, the recirculation of aftertreated exhaust gas by low-pressure EGR ensures that the sensor is not contaminated with soot particles contained in the exhaust gas and/or by oil contained in the exhaust gas. On the other hand, the charge air is at an elevated temperature after the compression in the compressor. The latter fact helps the sensor, which is generally equipped with an electric heating mechanism, to reach and maintain its operating temperature.

Aside from the recirculation of hot exhaust gases, however, further measures are necessary in order to reduce the pollutant emissions. Internal combustion engines are often therefore equipped with a plurality of exhaust-gas aftertreatment systems.

For the oxidation of the unburned hydrocarbons (HC) and of carbon monoxide (CO), oxidation catalytic converters are provided in the exhaust system. If nitrogen oxides ($NO_x$) are additionally to be reduced, this may be achieved, in the case of Otto engines, through the use of a three-way catalytic converter, which however for this purpose requires stoichiometric operation ($\lambda \approx 1$) within narrow limits.

For the reduction of the nitrogen oxides, either selective catalytic converters are used in which reducing agent is introduced into the exhaust gas in a targeted manner in order to selectively reduce the nitrogen oxides, or nitrogen oxide storage catalytic converters are used in which the nitrogen oxides are initially absorbed, that is to say collected and stored, in the catalytic converter before then being reduced during a regeneration phase with a lack of oxygen.

According to the previous systems, to minimize the emissions of soot particles, use is made of so-called regenerative particle filters which filter the soot particles out of the exhaust gas and store them, with said soot particles being burned off intermittently during the course of the regeneration of the filter.

To monitor the abovementioned exhaust-gas aftertreatment systems and/or to check their functional capability, an oxygen sensor arranged at the outlet side in the exhaust-gas discharge system of the internal combustion engine may be used or may be expedient, because reactions taking place in the aftertreatment systems change the oxygen concentration $O_2$ in the exhaust gas, that is to say in the gas flow relevant in the present case.

To improve the emissions behavior of an internal combustion engine and to basically improve the operation of the internal combustion engine, high-quality control and/or regulation may be provided, that is to say to control and/or regulate as exactly as possible the exhaust-gas aftertreatment systems provided in the exhaust-gas discharge system and an exhaust-gas recirculation system which influences the composition of the charge air.

High-quality control and/or regulation assumes that the signals output by the sensors are as accurate as possible, in particular, the oxygen concentration detected by the oxygen sensor and/or the oxygen concentration provided to the engine controller for further use has the least possible error.

However, conventional oxygen sensors are calibrated to output an oxygen concentration assuming a single, constant pressure of oxygen within the sensor. Frequently, the pressure of the oxygen in the sensor fluctuates, resulting in errors in the measured oxygen concentration.

The inventors have recognized the issues with the above approach and offer a method to at least partly address them. In one embodiment, a method for determining oxygen concentration in a gas flow of an internal combustion engine which is equipped with an engine controller and an oxygen sensor comprises determining the oxygen concentration of the gas flow in a ceramic measurement cell of the sensor by current which can be detected by measurement and which flows when a constant voltage is applied and maintained, and correcting the oxygen concentration based on a pressure at the measurement cell.

In this way, the method according to the disclosure takes into consideration that the pressure $p_{Sens}$ in the gas flow and therefore in the measurement cell of the sensor varies and has an influence on the oxygen concentration $O_{2,sens}$ provided by the sensor. This permits considerably improved control and/or regulation of the internal combustion engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
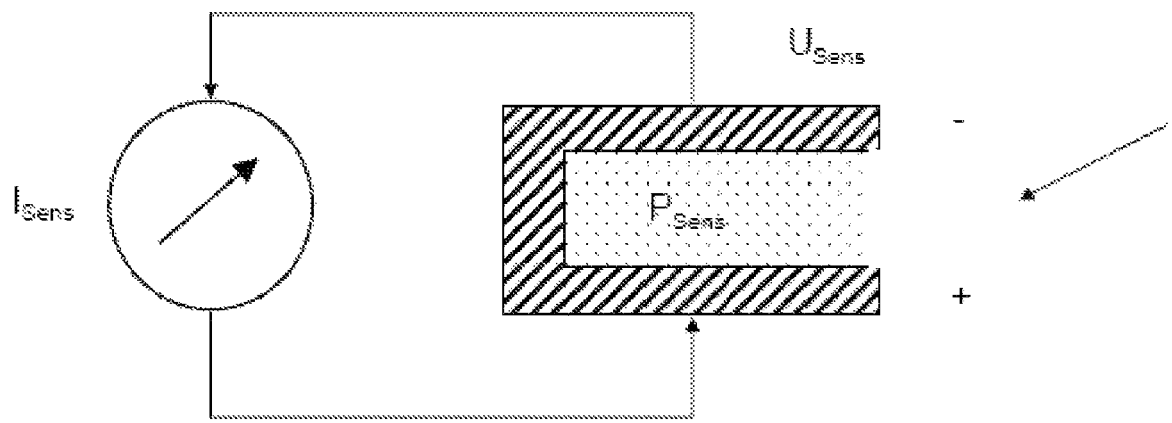
FIG. 1a schematically shows the construction of an oxygen sensor.

Oxygen sensors utilize a measurement cell including spaced apart free ends. A constant voltage $U_{Sens}$ is applied and maintained between the free ends of the measurement cell, wherein the current $I_{Sens}$ which is generated by the oxygen molecules and which flows between the free ends is detected by measurement (see FIG. 1a). The underlying measurement principle of the sensor for determining the oxygen concentration $O_2$ is based on the fact that the oxygen concentration $O_2$ in the gas flow is proportional to the current $I_{Sens}$ detected by measurement.

The oxygen sensors known from previous systems have a measurement cell of ceramic construction, into which the gas flow which flows around the measurement cell enters via a diffusion passage. Arranged in the measurement cell is an oxygen pump, which can be regulated by an electrical pump current $I_{sens}$. A constant voltage $U_{Sens}$ is maintained across the terminals of the pump by regulating the pump current $I_{sens}$. If the voltage $U_{sens}$ remains constant, equilibrium has been established between the oxygen supply via the diffusion passage and the oxygen discharge via the oxygen pump, wherein the oxygen concentration can be determined on the basis of the pump current $I_{Sens}$ which is required for this purpose, which current is detected by measurement (see FIG. 1a). The underlying measurement principle of the sensor for determining the oxygen concentration $O_2$ is based on the fact that the oxygen concentration $O_2$ in the gas flow is approximately proportional to the current $I_{Sens}$ detected by measurement.

Figure 1B:
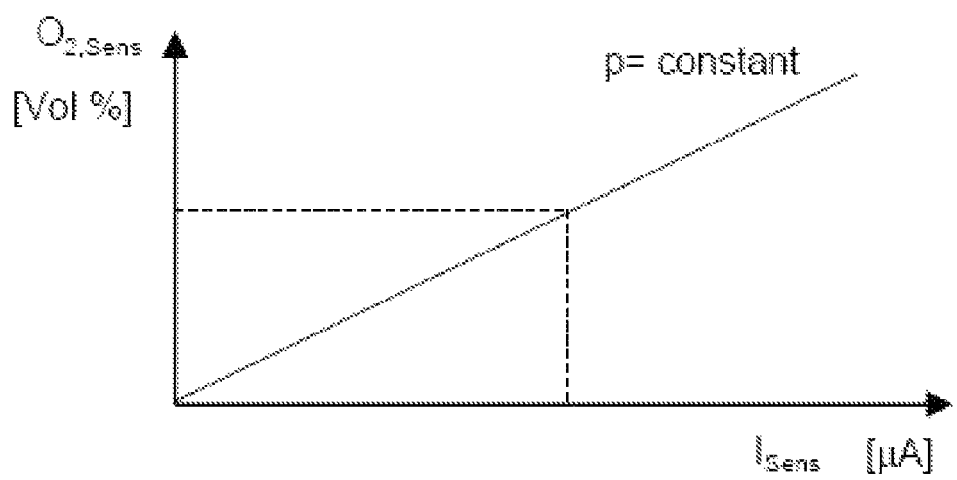
FIG. 1b shows, in a diagram, the functional relationship between the sensor current $I_{Sens}$ and the oxygen concentration $O_{2,sens}$.

As can be seen from FIG. 1b, there is a functional relationship between the oxygen concentration $O_{2,sens}$ and the current $I_{Sens}$ detected by measurement. The following relationship applies:

$$O_{2,sens}=f(I_{Sens})$$

FIG. 1b shows the functional relationship in a diagram, wherein the sensor current $I_{Sens}$ is plotted on the abscissa in [mA] and the oxygen concentration $O_{2,sens}$ is plotted in [Vol %] on the ordinate.

Since firstly the magnitude of the sensor current $I_{Sens}$ is measured from the number of oxygen molecules, which function as charge carriers, per unit time, and secondly the oxygen concentration $O_{2,sens}$ is plotted, as per FIG. 1b, in [Vol %], the gradient of the linear function $f(I_{Sens})$ illustrated in FIG. 1b changes if the density in the gas flow, that is to say the pressure $p_{Sens}$, at the measurement cell changes.

The methods known from the previous systems do not take into consideration the influence of the pressure on the oxygen concentration $O_{2,sens}$ output by the sensor. In fact, the functional relationship $O_{2,sens}=f(I_{Sens})$ for a single specific pressure $p_0$ is determined and stored in the engine controller for further use.

If a pressure $p_{Sens}$ higher than the pressure $p_0$ on which the functional relationship $f(I_{Sens})$ was based now actually prevails in the measurement cell, that is to say $p_{Sens}>p_0$, the sensor outputs too high an oxygen concentration $O_{2,sens}$ in [Vol %]. In contrast, if $p_{Sens}<p_0$, the sensor outputs too low an oxygen concentration $O_{2,sens}$, that is to say an oxygen concentration which is lower than the oxygen concentration $O_{2,tat}$ actually present in the gas flow.

An erroneously determined oxygen concentration $O_2$ has an adverse effect on the quality of the control and/or regulation of the internal combustion engine, that is to say on the quality of the control and/or regulation of the exhaust-gas aftertreatment systems and of the exhaust-gas recirculation, and therefore on the emissions behavior.

In particular in the case of supercharged internal combustion engines, in which the pressure conditions can vary more intensely, the fact that consideration is not given to the influence of the pressure on the oxygen concentration $O_2$ provided by the sensor has a negative impact.

The first sub-object is achieved by means of a method for determining the oxygen concentration $O_2$ in a gas flow of an internal combustion engine which is equipped with an engine controller and an oxygen sensor, in which method the oxygen concentration $O_{2,sens}$ of the gas flow is determined in a measurement cell, which is of ceramic construction, of the sensor by means of a current $I_{Sens}$ which can be detected by measurement and which flows when a constant voltage $U_{Sens}$ is applied and maintained, and which method is characterized in that the pressure $p_{Sens}$ at the measurement cell is also taken into consideration in the determination of the oxygen concentration $O_2$.

Here, the consideration of the pressure prevailing in the gas flow may be realized in very different ways. For example, for a multiplicity of different pressures $p_{Sens,i}$, different functions $O_{2,sens}=f_i(I_{Sens})$ may be stored in the engine controller and used. Then, to determine the oxygen concentration $O_2$, in a first method step, the pressure in the gas flow is determined. This may be realized mathematically or else likewise by measurement by a sensor. Then, not only the sensor current $I_{Sens}$ detected by measurement but also the pressure $p_{Sens}$ at the measurement cell serve as input signals for the engine controller, wherein firstly the function $f_i(I_{Sens})$ corresponding to the presently prevailing pressure $p_{Sens,i}$ is determined and, subsequently, the oxygen concentration $O_{2,sens}$ is read out using said function and the present current $I_{Sens}$. The function or functions $f_i(I_{Sens})$ may be stored as tables or look-up tables in the engine controller.

Examples are advantageous in which the pressure $p_{Sens}$ is detected by measurement by a sensor. Many internal combustion engines are already equipped with at least one pressure sensor. Supercharged internal combustion engines generally have a pressure sensor for detecting the charge pressure, that is to say the pressure in the charge-air flow downstream of a single-stage or two-stage compression by means of compressors. Since, in a supercharged internal combustion engine, the oxygen sensor is preferably also arranged downstream of the compressor on account of the higher temperature level, the charge pressure sensor would, with the charge pressure, simultaneously output the pressure $p_{Sens}$ prevailing at the measurement cell of the oxygen sensor, such that within the context of the method according to the disclosure for determining the pressure, already existing sensors may be used, and no additional sensors need be provided.

Additionally, pressure sensors are already used not only in the intake system of an internal combustion engine but also in the exhaust-gas discharge system. As a criterion for the initiation of the regeneration of a particle filter, consideration is often given to the exhaust-gas counterpressure prevailing upstream of the filter, that is to say the pressure in the gas flow upstream of the filter, which rises as the particle mass in the filter increases. Said exhaust-gas counterpressure would also prevail at an oxygen sensor provided upstream of the filter, such that the exhaust-gas counterpressure depicts, that is to say represents, the pressure $p_{Sens}$ prevailing at the measurement cell of the sensor.

Examples are nevertheless also advantageous in which the pressure $p_{Sens}$ is determined mathematically by a model. A plurality of mathematical models may also be used. Taking as a starting point the ambient pressure which is known at least approximately and which prevails at the inlet of the intake system and at the outlet from the exhaust-gas discharge system, the pressure at virtually any desired point of the line system of an internal combustion engine can be calculated, that is to say estimated, by simulation.

The mathematical determination may also be combined with a detection of the pressure by measurement, that is to say may take a pressure detected by a pressure sensor as a starting point. For example, in the case of a supercharged internal combustion engine, if a charge pressure detected by measurement by a sensor is present, then taking said pressure as a starting point, it is possible by simulation calculations to infer the pressure upstream of the compressor, which pressure then constitutes the pressure $p_{Sens}$ at the measurement cell for an oxygen sensor arranged upstream of the compressor.

Examples are advantageous in which a variation of the sensitivity of the sensor is also taken into consideration in the determination of the oxygen concentration $O_2$. The sensitivity of oxygen sensors fluctuates, specifically firstly from sensor to sensor on account of production-related tolerances, that is to say the sensors already have different sensitivities when they leave the factory, and secondly even in a single sensor, as a result of operation and/or as a result of external influences to which the sensor is exposed during operation. In this context, the contamination of the sensor by exhaust-gas constituents and the thermal aging of the sensor as a result of thermal loading also play a role.

The differences in the original sensitivity and/or the changes in sensitivity occurring during the operation of the sensor may also be taken into consideration, that is to say compensated, in the determination of the oxygen concentration $O_2$. In this regard, examples are advantageous in which a corrected oxygen concentration $O_{2,cor}$ is determined using the equation $$O_{2,cor}=f(I_{Sens})*f(p_{Sens})*C_{adap}$$

wherein $C_{adap}$ is a variation factor, which is a dimensionless factor with which the variation of the sensitivity of the sensor is compensated. The function $f(p_{Sens})$ serves for the compensation of pressure changes, that is to say for taking into consideration a changing pressure $p_{Sens}$ in the gas flow.

It is noted at this juncture that the general expression "oxygen concentration $O_2$" is a collective term under which the different specific oxygen concentrations, specifically the oxygen concentration $O_{2,Sens}$ output by the sensor and the corrected oxygen concentration $O_{2,cor}$, are subsumed.

In conjunction with the embodiment in question, method variants are advantageous in which the corrected oxygen concentration $O_{2,cor}$ is determined using the equation $$O_{2,cor} = O_{2,sens}\left(\frac{K_p + p_0}{K_p + p_{sens}} \frac{p_{sens}}{p_0}\right)C_{adap}, \qquad (1)$$

wherein $p_0$ is a predefinable reference pressure, $O_{2,sens}$ is the oxygen concentration provided as an output signal by the sensor, and $K_p$ is a pressure factor with which a deviation of the pressure $p_{Sens}$ from the reference pressure $p_0$ is compensated.

The oxygen concentration $O_{2,sens}$ output by the sensor as an output signal is in principle afflicted with errors because it takes into consideration neither changes in sensitivity nor variations in pressure.

Aside from the factor $C_{adap}$ which has already been explained, correction is also achieved through the function $$f(p_{Sens}) = \left(\frac{K_p + p_0}{K_p + p_{sens}} \frac{p_{sens}}{p_0}\right)$$

The function $f(p_{Sens})$ serves for the compensation of pressure changes, that is to say for taking into consideration a changing pressure $p_{Sens}$ in the gas flow. As a reference pressure $p_0$, it is preferable—but not imperative—for the ambient pressure $p_{atm}$ to be used. Since the pressure $p_{Sens}$ in the gas flow is determined mathematically and/or detected by measurement, the factor $K_p$ is the only unknown in the function $f(p_{Sens})$. If the pressure $p_{Sens}$ in the gas flow corresponds to the reference pressure $p_0$, for which the function $f(I_{Sens})$ was determined, compensation with regard to a pressure deviation is not required. The function $f(p_{Sens})$ consequently assumes the value 1. The following relationship applies: $f(p_{Sens}=p_0)=1$.

Examples are advantageous in which the factors $C_{adap}$ and $K_p$ are determined during the course of a calibration by the engine controller. During the course of the calibration, an iteration is carried out which may comprise a predefinable number n of iteration steps, for example n=10, wherein the starting values for the factors $C_{adap}$ and $K_p$ may be predefined.

Since the factor $C_{adap}$ also takes into consideration the differences in the original sensitivity, said factor is also a quality feature for new sensors, that is sensors before they are first put into operation. In this respect, for the factor $C_{adap}$, it may be expedient to predefine a value range within which the factor may lie, for example $0.95<C_{adap}<1.05$ or $0.9<C_{adap}<1.1$. For the iteration, a starting value is then selected which likewise lies within the predefined value range.

For the pressure factor $K_p$, a value range may likewise be predefined within which the factor $K_p$ should lie, for example $1.1<K_p<1.7$ or $1.2<K_p<1.6$.

Examples are advantageous in which the calibration is carried out in an operating state of the internal combustion engine in which the corrected oxygen concentration $O_{2,cor}$ in the gas flow is known.

To be able to carry out the calibration or iteration using the equation (1), knowledge of the corrected, that is to say actual oxygen concentration $O_{2,cor}$ is required. In this respect, it is advantageous for the calibration to be carried out in an operating state of the internal combustion engine in which the corrected, that is to say actual oxygen concentration $O_{2,cor}$ in the gas flow is known. The equation (1) then contains only two unknowns, specifically the factors $C_{adap}$ and $K_p$.

Here, embodiments of the method are advantageous in which the calibration is carried out when the oxygen concentration $O_2$ or $O_{2,cor}$ in the gas flow corresponds to the oxygen concentration $O_{2,atm}$ in the ambient air, that is to say when, in dry ambient air, the following relationship applies: $O_{2,cor}=O_{2,atm}\approx 21\%$.

Embodiments of the method are advantageous in which the calibration is carried out in the overrun mode of the internal combustion engine, also referred to as deceleration fuel shut-off. During the overrun mode, the fuel supply of the internal combustion engine is basically deactivated, such that only fresh air is delivered or sucked in and flows through the cylinders and the intake system and exhaust-gas discharge system. Consequently, the oxygen concentration in the gas flow composed of fresh air corresponds to the oxygen concentration in the ambient air. In dry ambient air, the following relationship applies: $O_{2,cor}=O_{2,atm}\approx 21\%$.

After a few working cycles, the gas-conducting lines have been adequately flushed with fresh air, specifically also the lines of the exhaust-gas discharge system and the lines of a possibly non-deactivated exhaust-gas recirculation system, such that it is ensured that fresh air is situated at every point of the intake and exhaust-gas discharge systems. As a result, the oxygen concentration at the oxygen sensor corresponds in any case to that in the ambient air, regardless of the location at which the sensor is arranged.

For the reasons stated above, examples are advantageous in which the calibration is carried out n working cycles after the internal combustion engine passed into the overrun mode.

As already mentioned, embodiments of the method are advantageous in which, to carry out the calibration for the factors $C_{adap}$ and $K_p$, value ranges are predefined within which the factors may lie. The present embodiment specifies that not only the starting values of the two factors but rather all the values of the factors may lie in the predefined ranges during the calibration or iteration.

An oxygen sensor for carrying out a method of the above-specified type, is achieved by means of an oxygen sensor in which the current $I_{Sens}$ which is detected by measurement and which flows in the measurement cell, which is of ceramic construction, of the sensor at a constant voltage $U_{Sens}$ serves for the determination of the oxygen concentration $O_2$ of a gas flow of the internal combustion engine by an engine controller, which oxygen sensor is characterized in that an element for the detection by measurement of the pressure $p_{Sens}$ is provided on the measurement cell of the sensor.

That which has been stated in conjunction with the method according to the disclosure likewise applies to the oxygen sensor according to the disclosure.

Since, in the method according to the disclosure, the pressure $p_{Sens}$ in the gas flow is to be taken into consideration in the determination of the oxygen concentration $O_2$, it is extremely advantageous for the pressure to be determined at precisely the location at which the oxygen concentration is also determined, specifically at or in the measurement cell of the sensor.

The sensor according to the disclosure also offers further advantages. The integral design of the oxygen and pressure sensor in a common component, that is to say measurement probe, reduces for example the assembly costs, because only a single sensor may be installed instead of two sensors, and therefore also the provision costs. The spatial requirement for the sensors for detecting the pressure $p_{Sens}$ and the oxygen concentration $O_2$ is likewise reduced.

Examples of the sensor are advantageous in which an element for the detection by measurement of the temperature $T_{Sens}$ at the measurement cell of the sensor is provided. Similarly to the pressure $p_{Sens}$, the temperature $T_{Sens}$ also has an influence on the density in the gas flow. The detection of the temperature therefore contributes to an increase in the quality of the determined oxygen concentration.

In supercharged internal combustion engines, which in the intake systems are equipped with a compressor of an exhaust-gas turbocharger and with a charge-air cooler arranged downstream of the compressor, examples are advantageous in which the oxygen sensor is arranged between the compressor and the charge-air cooler.

Figure 2:
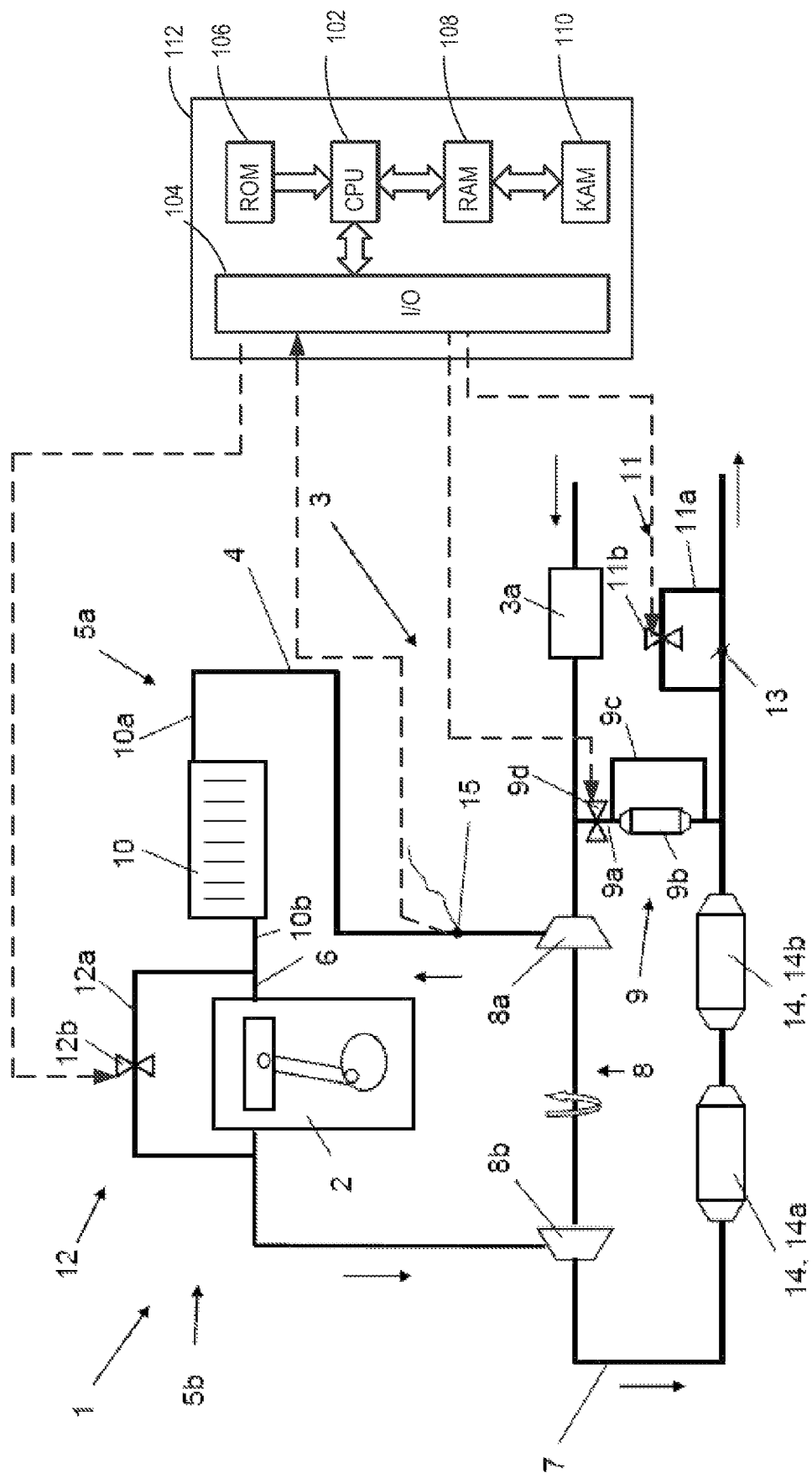
FIG. 2 schematically shows an embodiment of an internal combustion engine having a sensor.

FIG. 2 schematically shows an embodiment of an internal combustion engine 1 having a sensor 15, which internal combustion engine has at least one cylinder 2. Within the context of the present disclosure, the expression "internal combustion engine" encompasses diesel engines, spark-ignition engines and also hybrid internal combustion engines.

Each cylinder 2 has at least one inlet opening and is supplied with charge air via an intake system 3 provided on the inlet side 5a. The intake system 3 comprises not only an intake line 4 but also an inlet manifold 6 which leads to the inlet openings of the cylinders 2. To discharge the exhaust gases, each cylinder 2 has at least one outlet opening which is adjoined by an exhaust line 7.

The internal combustion engine 1 illustrated in FIG. 2 is supercharged by an exhaust-gas turbocharger 8 and is furthermore equipped with an exhaust-gas recirculation arrangement 9, 12. The charger 8 has a turbine 8b, which is arranged in the exhaust line 7, and a compressor 8a, which is arranged in the intake line 4. To form a low-pressure EGR arrangement 9, a recirculation line 9a is provided which branches off from the exhaust line 7 downstream of the turbine 8b and opens into the intake line 4 upstream of the compressor 8a, and in which a cooler 9b is arranged which lowers the temperature in the hot exhaust-gas flow before the exhaust gas is mixed, upstream of the compressor 8a, with fresh air which is sucked in via the intake line 4 through an air filter 3a. Also arranged in the recirculation line 9a is a shut-off element 9d which functions as a low-pressure EGR valve 9d and which serves for adjusting the exhaust-gas quantity recirculated via the low-pressure EGR arrangement 9. The low-pressure EGR arrangement 9 has a bypass line 9c for bypassing the cooler 9b.

Upstream of the branching of the recirculation line 9a, the exhaust line 7 has arranged in it two exhaust-gas aftertreatment systems 14, specifically an oxidation catalytic converter 14a and a particle filter 14b, which ensure that only aftertreated exhaust gas passes into the intake system 3 via the low-pressure EGR arrangement 9.

Since the recirculation of exhaust gas from the exhaust line 7 into the intake line 4 requires a pressure difference, that is to say a pressure gradient, a system 11 for adjusting the exhaust-gas counterpressure is provided. A throttle 13 arranged in the exhaust line 7 is equipped with a bypass line 11a. By suitable adjustment of the throttle 13 and of a shut-off element 11b provided in the bypass line 11a, the exhaust-gas counterpressure upstream of the throttle 13 can be varied and controlled.

The exhaust gas introduced into the intake line 4 via the low-pressure EGR arrangement 9 is mixed with fresh air. The charge air thus formed is supplied to the compressor 8a and compressed. Downstream of the compressor 8a, the compressed charge air is then cooled in a charge-air cooler 10 which is provided in the intake line 4.

The charge-air cooler 10 is situated above the at least one inlet opening of the at least one cylinder 2. The geodetic height in the intake system 3 decreases in the flow direction proceeding from the inlet 10a into the charge-air cooler 10 toward the cylinder 2, such that there is a continuous downward slope in the flow direction. This is also achieved in that the inlet 10a into the charge-air cooler 10 is situated geodetically higher than the outlet 10b out of the charge-air cooler 10. An accumulation and an abrupt introduction of condensate, in particular condensed water, are thereby prevented.

To be able to generate very high recirculation rates, an additional exhaust-gas recirculation arrangement 12 is provided. To form said high-pressure EGR arrangement 12, a line 12a is provided which branches off from the exhaust line 7 upstream of the turbine 8b and opens into the intake system 3 downstream of the charge-air cooler 10. To adjust the exhaust-gas quantity recirculated via the high-pressure EGR arrangement 12, a shut-off element 12b which serves as a high-pressure EGR valve 12b is arranged in the line 12a.

A sensor 15 for detecting the oxygen concentration $O_2$,sens in the charge air is provided downstream of the opening of the recirculation line 9a into the intake line 4. The sensor 15 is arranged downstream of the compressor 8a between the compressor 8a and the charge-air cooler 10, such that only the exhaust gas recirculated via the low-pressure EGR arrangement 9 passes the sensor 15.

As it flows through the compressor 8a, the charge air composed of a mixture of fresh air and exhaust gas is homogenized, which improves the quality of the measurement because the concentration $O_2$ detected by means of the sensor 15 can be regarded as being representative of the charge-air flow.

The temperature of the charge air downstream of the compressor 8a is increased as a result of compression, which counteracts the condensing-out of water and helps the sensor 15 to attain the operating temperature.

If the exhaust-gas recirculation 9, 12 takes place exclusively via the low-pressure EGR arrangement 9, that is to say the high-pressure EGR arrangement 12 is deactivated, the low-pressure EGR arrangement 9 can be operated by closed-loop control.

The oxygen concentration $O_2$,sens detected by the sensor 15 may be used for determining the proportion $F_{intake}$ of the charge air fraction resulting from the combustion, and/or for determining the recirculation rate $x_{EGR}$. Using the sensor 15, it is therefore possible for the recirculation rate $x_{EGR}$ of the low-pressure EGR arrangement 9 to be adjusted, that is to say for the shut-off element 9d arranged in the recirculation line 9a to be actuated in order to adjust the recirculation rate. The nitrogen oxide concentration $C_{NOx,exhaust}$ in the exhaust gas may likewise be determined on the basis of the oxygen concentration.

Controller 112 is shown in FIG. 2 as a conventional microcomputer including: microprocessor unit 102, input/output ports 104, read-only memory 106, random access memory 108, keep alive memory 110, and a conventional data bus. Controller 112 may include instructions that are executable to carry out one or more control routines. Controller 112 is shown receiving various signals from sensors coupled to engine 1, such as input from sensor 15, as well as other sensors not shown in FIG. 2. Example sensors include engine coolant temperature (ECT) from a temperature sensor, a position sensor coupled to an accelerator pedal for sensing accelerator position, a measurement of engine manifold pressure (MAP) from a pressure sensor coupled to the intake manifold, an engine position sensor from a Hall effect sensor sensing crankshaft position, a measurement of air mass entering the engine from sensor (e.g., a hot wire air flow meter), and a measurement of throttle position. Barometric pressure may also be sensed for processing by controller 112. In a preferred aspect of the present description, an engine position sensor may produce a predetermined number of equally spaced pulses every revolution of the crankshaft from which engine speed (RPM) can be determined. Controller 112 may also output signals to various actuators of the engine, such as valves 9d, 11b, and 12b, based on feedback from signals received from the various engine sensors.

Thus, the system of FIG. 2 provides for an oxygen sensor system for an internal combustion engine comprising an oxygen sensor including a ceramic measurement cell in which current $I_{Sens}$ is detected by measurement at a constant voltage $U_{Sens}$ to determine an oxygen concentration $O_2$ of a gas flow of the internal combustion engine and an element for measurement of a pressure $p_{Sens}$ provided on the ceramic measurement cell. The oxygen sensor system also includes an engine controller including instructions to correct the determined oxygen concentration based on the pressure measurement.

Figure 3:
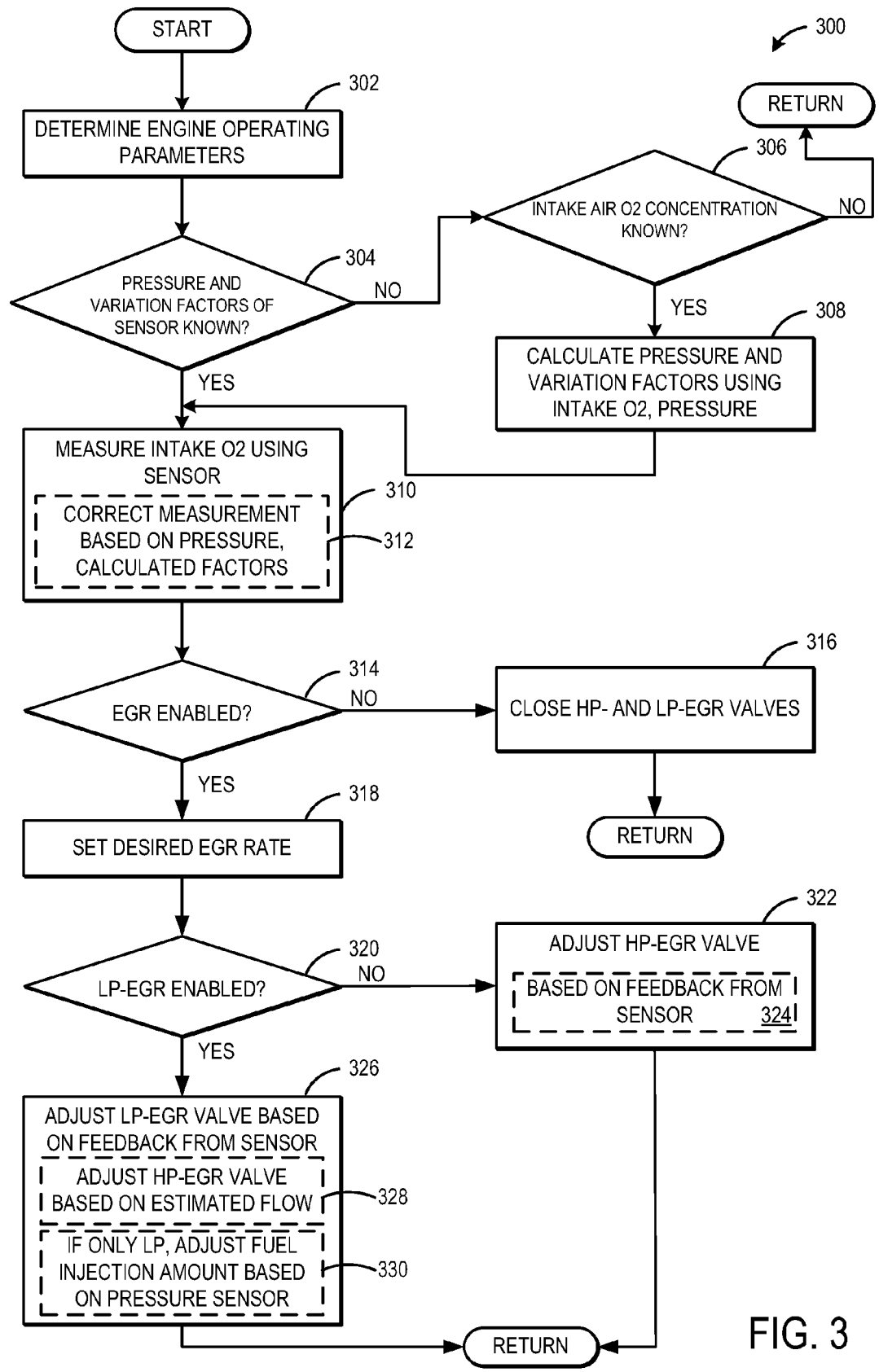
FIG. 3 is a flow chart illustrating an example method for operating a supercharged internal combustion engine including both an LP-EGR and HP-EGR system according to an embodiment of the present disclosure.

FIG. 3 is a flow chart illustrating a method 300 for controlling an LP-EGR and/or HP-EGR system based on feedback from a sensor positioned in the intake of an engine. Method 300 may be carried out by the control system of a vehicle, such as controller 112, in response to signals received from various engine sensors, such as an oxygen sensor (e.g., sensor 15 of FIG. 2).

Method 300 comprises, at 302, determining engine operating parameters. Engine operating parameters may include engine speed, load, temperature, MAP, etc. Determining the engine operating parameters may also include determining if the various correction factors discussed above are set in the memory of the controller, such as the pressure factor $K_p$ and variation factor $C_{adap}$.

At 304, it is determined if the pressure factor and variation factor are known. If not, the pressure factor and variation factor may be set during select operating conditions including when the oxygen concentration in the intake is known, such as during deceleration fuel shut-off. Thus, if the pressure and variation factors are not known, method 300 proceeds to 306 to determine if the oxygen concentration in the intake is known. The oxygen concentration in the intake may be substantially equal to ambient oxygen concentration during certain operating conditions, such as when fuel injection is stopped (but intake air is still pumped through the cylinders) during deceleration fuel shut-off.

If the intake oxygen concentration is not known, method 300 returns to continue to determine operating parameters. If the oxygen concentration is known, method 300 proceeds to 308 to set the pressure and variation factor values based on the known oxygen concentration as well as a measured pressure of the intake air. These may be determined based on the equation:

$$O_{2,cor} = O_{2,sens}\left(\frac{K_p + p_0}{K_p + p_{sens}} \frac{p_{sens}}{p_0}\right) C_{adap}$$

After the pressure and variation factor values are set, they may be stored in the memory of the controller for future use in correcting a measured oxygen concentration, such as at 310, where the intake air oxygen concentration is measured using the intake sensor. The intake oxygen concentration may be measured by the sensor if it is determined at 304 that the pressure and variation factors are known. Measuring the intake air oxygen concentration may include correcting the measured oxygen concentration using the known pressure and variation factors as well as correcting using a measured pressure of the intake air, as determined from the pressure sensor portion of the intake sensor, at 312. The measured oxygen concentration may be corrected using the above equation.

At 314, it is determined if EGR is enabled. EGR may be enabled dependent on operating parameters. For example, EGR may be disabled if engine temperature is below a threshold, if engine speed and load are below a threshold (e.g., the engine is operating at idle), etc. If EGR is not enabled, method 300 proceeds to 316 to close both the LP- and HP-EGR valves. If EGR is enabled, method 300 proceeds to 318 to set a desired EGR rate based on operating parameters. The desired EGR rate may be set in a suitable manner, such as based on a table located in the memory of the controller, and may be determined based on engine speed and load. Further, depending on engine speed and load and other operating parameters, the LP-EGR system may be enabled at the desired rate, the HP-EGR system may be enabled at the desired rate, or both the LP- and HP-EGR systems may be enabled at the desired rate.

At 320, method 300 includes determining if LP-EGR is enabled. If LP-EGR is enabled, method 300 proceeds to 326 to adjust an LP-EGR valve based on feedback from the oxygen sensor. The oxygen sensor may indicate the relative fraction of charge air that is comprised of EGR, and thus the LP-EGR valve may be adjusted based on feedback from the sensor to reach the desired EGR rate. Further, in some embodiments, the sensor may be used to determine the NOx concentration in the charge air, and thus in the EGR. The LP-EGR valve may be adjusted to control the amount of NOx in the exhaust, for example the valve may be opened in order to increase the EGR rate and thus lower the NOx concentration. Further, in some examples, if the HP-EGR system is also enabled (as determined at 318 by engine operating parameters), the HP-EGR valve may be controlled based on an estimated flow through the HP-EGR system at 328. The flow may be estimated based on a determined position of the HP-EGR valve, determined position of the LP-EGR valve, determined pressure upstream and/or downstream of the HP-EGR valve, etc.

Further, the pressure measurement taken while correcting the oxygen concentration may serve additional functions during engine operation. For example, if only the LP-EGR system is enabled (or if no EGR is enabled), the pressure measurement may be used to approximate manifold absolute pressure (MAP). This pressure measurement may be a backup to a MAP sensor present in the manifold, or may be used to verify proper functioning of the MAP sensor. In some embodiments, at 330, when no HP-EGR is flowing, the pressure measurement may be used to adjust a fuel injection amount to maintain desired combustion air-fuel ratio in the cylinders.

If LP-EGR is not enabled, only HP-EGR is enabled and method 300 proceeds to 322 to adjust the HP-EGR valve to deliver the desired EGR rate. In some embodiments, such as when the sensor is located downstream of the HP-EGR inlet in the intake, the HP-EGR valve may be adjusted based on feedback from the sensor at 324. However, in embodiments where the sensor is located upstream of the HP-EGR inlet (such as the embodiments illustrated in FIG. 2), HP-EGR may not be controlled based on feedback from the sensor but may only be controlled based on the table stored in the memory of the controller and estimated flow through the HP-EGR system as described above. Upon either closing the valves or adjusting the LP-EGR and/or HP-EGR valve, method 300 returns.

Thus, the method of FIG. 5 provides for operating a supercharged internal combustion engine including both an LP-EGR and HP-EGR system. The method comprises correcting a measured intake air oxygen concentration with at least a measured pressure of the intake air, and if the LP-EGR system is enabled, adjusting an LP-EGR valve based on the corrected measured intake air oxygen concentration. The method may also include if the HP-EGR system is enabled, adjusting an HP-EGR valve based on estimated HP-EGR flow, correcting the measured intake air oxygen concentration based on a pressure factor and a variation factor, and/or setting the pressure factor and the variation factor during select conditions including known intake air oxygen concentration, such as deceleration fuel shut-off.

In this way, if only the HP-EGR or LP-EGR system is enabled, closed loop control of the enabled system may be improved by an oxygen sensor in the intake, which may provide a more accurate determination of the EGR rate than an oxygen sensor in the exhaust, or than other mechanisms of estimating the EGR flow. The oxygen concentration measured by the oxygen sensor may be corrected for the prevailing pressure in the intake to increase accuracy of the sensor readings in some conditions.

If both the HP-EGR and LP-EGR systems are enabled, the LP-EGR valve may be controlled based on feedback from the sensor while the HP-EGR system may be controlled based on estimated EGR flow. Feedback control of the LP-EGR system may provide an accurate LP-EGR rate, and the HP-EGR valve may be controlled based on estimated EGR flow, which may include a determined position of the LP-EGR valve. In this way, the HP-EGR system may be indirectly controlled via feedback from the oxygen sensor.

Figure 4:
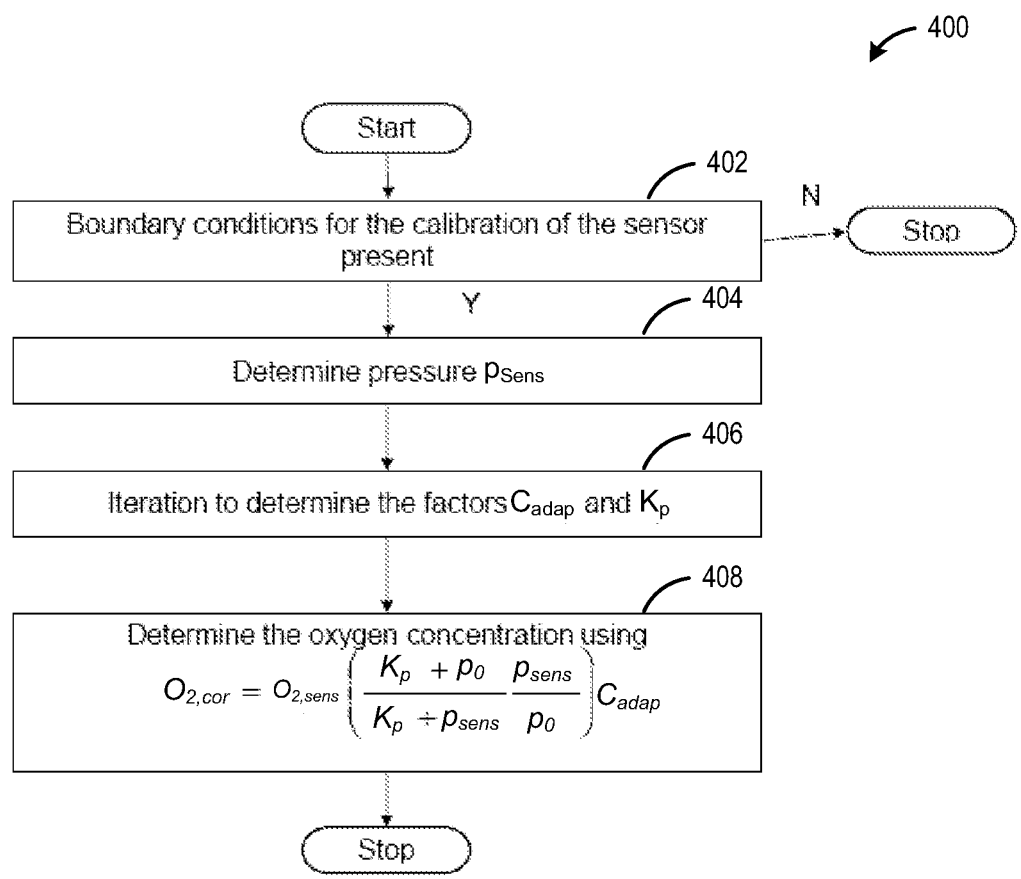
FIG. 4 shows, in the form of a flow diagram, a variant of the method for determining the oxygen concentration $O_2$.

FIG. 4 schematically shows, in the form of a flow diagram, a variant of the method for determining the oxygen concentration $O_2$, in highly simplified form. It is firstly checked whether the boundary conditions for the calibration of the sensor are present at 402. If this is not the case, the method is aborted. If, in contrast, the boundary conditions are present, firstly the pressure $p_{Sens}$ in the gas flow, that is to say at the measurement cell, is determined mathematically or else by measurement by a sensor at 404.

During the further course of the method, the factors $C_{adap}$ and $K_P$ are determined at 406. For this purpose, an iteration is carried out which comprises n iteration steps. At the start of the iteration, starting values for the factors $C_{adap}$ and $K_P$ are predefined. Both factors may lie within predefined value ranges during the calibration and iteration. If one of the two factors departs from the predefined value range, the iteration and therefore the calibration are aborted.

It may also be the case that the internal combustion engine is not operated for a sufficiently long time in the mode required for the calibration, for example in the overrun mode. Then, under some circumstances, the time available is not sufficient to carry out the n iteration steps, for which reason it may be checked in a separate method step whether an amount of data sufficient for calibrating the sensor was generated during the iteration. If this is not the case, the sensor may still be calibrated with regard to sensitivity using the factor $C_{adap}$, wherein the influence of the pressure remains disregarded, as in the conventional systems.

During the further course of the method, using the equation $$O_{2,cor} = O_{2,sens}\left(\frac{K_p + p_0}{K_p + p_{sens}} \frac{p_{sens}}{p_0}\right)C_{adap}$$

the oxygen concentration $O_{2,cor}$ is then determined at 408. A reference pressure $p_0$ is stored in the engine controller. The oxygen sensor outputs the oxygen concentration $O_{2,Sens}$ in the gas flow.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a supercharged internal combustion engine including both an LP-EGR and HP-EGR system, comprising:
   correcting a measured intake air oxygen concentration with at least a measured pressure of the intake air; and
   if the LP-EGR system is enabled, adjusting an LP-EGR valve based on the corrected measured intake air oxygen concentration.

2. The method of claim 1, further comprising:
   if the HP-EGR system is enabled, adjusting an HP-EGR valve based on estimated HP-EGR flow; and
   if only the LP-EGR system is enabled, adjusting a fuel injection amount based on the measured pressure of the intake air to maintain a desired combustion air-fuel ratio.

3. The method of claim 1, wherein correcting the measured intake air oxygen concentration further comprises correcting the measured intake air oxygen concentration based on a pressure factor and a variation factor.

4. The method of claim 1, wherein correcting the measured intake air oxygen concentration based on the pressure factor and the variation factor further comprises setting the pressure factor and the variation factor during select conditions including known intake air oxygen concentration.

5. The method of claim 4, wherein the select conditions comprise deceleration fuel shut-off.

\* \* \* \* \*